Reissued Apr. 23, 1929. Re. 17,281

UNITED STATES PATENT OFFICE.

IWAN OSTROMISLENSKY, OF NEW YORK, N. Y., ASSIGNOR, BY MESNE ASSIGNMENTS, TO THE PYRIDIUM CORPORATION, OF NEW YORK, N. Y., A CORPORATION OF NEW YORK.

ARYL-AZO-DIAMINOPYRIDINES USEFUL AS BACTERICIDES AND PROCESS OF MAKING THE SAME.

No Drawing. Original No. 1,680,108, dated August 7, 1928, Serial No. 676,855, filed November 24, 1923. Application for reissue filed March 1, 1929. Serial No. 343,834.

This invention relates to compounds useful as medicines and to processes for their manufacture. It is more particularly directed to a class of compounds having bactericidal action against various forms of bacteria, particularly the cocci; and processes for their manufacture.

The objects of the invention are to produce a series of compounds having a wide range of usefulness in destroying bacteria, which shall possess marked therapeutic value in treatment of various diseases of the body; and to provide a simple, easily-practiced process for the production of such compounds.

The invention comprises as a new material a non-poisonous composition made with diaminopyridine, having a bactericidal character. The compositions comprised herein are more specifically defined hereinafter. The invention also comprises a process for producing a bactericide which comprises forming a non-poisonous colloidal or semi-colloidal material with diaminopyridine. Where "colloidal material" or "colloidal solution" is employed in the claims it is intended to include a semi-colloidal material or semi-colloidal solution.

In accordance with the present invention, I have found that the simplest azodyes of 2–6 diaminopyridine, which may be expressed by the formula:—

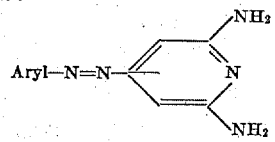

where the aryl may be an aryl group, with or without various radicals attached to the ring, such as phenyl-, para-ethyl-phenyl-, ortho-meta- and para-tolyl-, phenetidyl and sulfo-phenylazodiamino-pyridine, the latter having the following formula:—

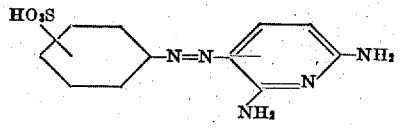

possess useful properties of semi-colloids, and have been known to be relatively nontoxic, while possessing specific bactericidal action, and they must be regarded as a new and characteristic, as well as most valuable, order of medical preparation, efficacious in infectious diseases, propagated by various microbes, and particularly by cocci.

It will be noted that diamino-pyridine, from which these compounds are derived, is related to quinine, in that both are derivatives of pyridine each having a pyridine nucleus, namely; a hexa-hydro-pyridine nucleus in the quinine molecule and a pyridine nucleus in the diamino-pyridine molecule. I have recognized in the course of my researches that diaminopyridine itself is a bactericide but it possesses a poisonous character. I have found however that this poisonous character may be overcome by forming colloidal or semi-colloidal materials with diaminopyridine such as those substances mentioned above. I have discovered that these substances exercise a marked specific action not so much in cases of malaria as in infectious diseases generated by various microbes. These substances are especially virulent in killing off various microbes of the cocci group, such as pneumo-staphylo-, diplo-, strepto- and gono-cocci, the generator of venereal sores (ulcus molle) etc. While such bactericidal action is found often in a millionth dilution, these semi-colloidal and colloidal substances formed with diaminopyridine remain almost passive toward the intestinal flora of the human and animal bodies.

The following are some examples of the form in which the compounds may be administered:

1. A saturated 0.6% solution of phenylazodiaminopyridine hydrochloride is prepared in distilled water. This solution is prepared in boiling distilled water; in the presence of mineral salts such as ordinary table salt, the solubility of the hydrochloride is sharply reduced.

2. A supersaturated 3% fresh solution of hydrochloride in distilled water. The solution should be made up just prior to use and will keep without sedimentation for about one hour.

3. A thin emulsion of phenylazodiamino-pyridine hydrochloride in distilled water containing for example 10% of the base phenylazodiaminopyridine. This emulsion is made by means of quick and even cooling down of the 10% solution of phenylazodiaminopyridine hydrochloride prepared by boiling this material in distilled water. The voluminous mass originally obtained is filtered under pressure to remove free liquid. It is thereafter left to stand in a closed vessel for 12 to 24 hrs. It should be throughly shaken before using.

4. A 5–10% salve of phenylazodiaminopyridine hydrochloride, in lanolin, vaseline, resorbin, etc.

5. A salve of phenylazodiaminopyridine (for example 10%) in lanolin or other greases.

6. An alcohol solution of phenylazodiaminopyridine either as the base or as the hydrochloride. These materials dissolve more readily in alcohol than they do in water. A preferred percentage is about 3%.

7. For application in powder form, ground, dried, hydrochloride of phenylazoiaminopyridine.

8. Gelatine capsules containing varying amounts such as 0.2–0.5 grams of compound (hydrochloride).

Clinical researches have shown results in vivo coinciding closely with results made in vitro. The medical properties and bactericidity of the members of the group have been in accordance with my experience most marked in the following members; phenyl-, paraethylphenyl-, ortho-, meta- and para-tolyl and para-ethoxy-azodiaminopyridine. I have not found that the benzidine azodyes of diaminopyridine have the specific medical properties of the other materials described herein. These benzidine azodyes both in the form of salts and in the free state dissolve with great difficulty even in boiling water. The compositions may be applied in various diseases and the following are some of the specific instances where it has been found effective:—In cases of ulcus corneæ serpens, in various kinds of conjunctivis (purulent), in ulcus molle (chancroid), in furunculosis (boils) and in various cutaneous diseases of an infectious character, such as sties and pimples. It has also been applied prophylactically for washing fresh and infected wounds and burns, as well as in cases of trauma, where iodine has been indicated as an antiseptic. Its bactericidal character has been fully demonstrated by the applications mentioned.

In those cases where the focus of the disease can be reached by the composition a checking of the infection is rapidly accomplished. I have found that the composition is effective except in diseases generated by the intestinal flora. The use of the material is not accompanied by local or general reaction in the patient and can be introduced into the diseased organizism in many ways, namely; intraveneously, hypodermically, through the mouth, etc.

The following is a preferred process for manufacture of a composition in accordance with the invention:

Diaminopyridine is linked with diazotized paratoluidine and purified. Diazotization may be accomplished in the usual manner. Specifically a solution of 1.18 kilograms of freshly-distilled para toluidine in a mixture of 2.6 litres of fuming hydrochloric acid (specific gravity 1.19) with 80–100 litres of water is prepared and cooled with ice. To this 740 gms. of sodium nitrite dissolved in 20 litres of water is added in small quantities, shaking up this mixture quite often the while. The product obtained is poured into a solution of 1335 gms. of diamino-pyridine in 13350 cc. of 10% hyrdochloric acid, the mixture being stirred all the while. In order to neutralize the excess of hydrochloric acid, an aqueous saturated solution of sodium acetate is added to the general mixture until a weak acid reaction on Congo paper is obtained. The mixture is then left to stand for several hours at room temperature, during which time a separation of fine crystals of the hydrochloric acid salts of para-tolyl-azo-diamino-pyridine takes place.

The resulting material para tolylazodiaminopyridine should be purified. Purification by crystallization from hot water usually leaves mineral salts and particularly sodium chloride which interfere with the use of the material for hypodermic and intravascular injections. Furthermore, simple purification by such crystallizations from hot water produces a substance whose solubility in cold water is abnormally low. In order to purify the substance to make it suitable for hypodermic and intravascular injections as well as to increase its solubility, the para tolylazodiaminopyridine hydrochloride is treated with a 5–10% solution of ammonia at ordinary temperature. Basic free needles of a yellowish golden color separate and are carefully washed in a large amount of distilled water at a temperature just below its boiling point. The washed needles so obtained are then carefully heated in distilled water containing the theoretical amount of hydrochloric acid for that conversion. In order to make sure that no mineral acid then remains the preparation is recrystallized from hot distilled water.

In place of toluidine, aniline may be substituted, and upon diazotization in acid solution and coupling with 2–6-diamino-pyridine, phenyl-azo-diamino-pyridine is produced.

Sulphonic acids of the compounds

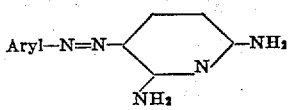

may be obtained by heating with fuming sulphuric acid. As an example of this process 1 part of phenylazodiaminopyridine was heated with 3 parts of fuming sulphuric acid, containing 5–15% of $SO_3$, for 1 to 3 hrs. at a temperature of 130–150° C. The material is preferably purified by washing. If desired it may be converted into its alkali metal salt by treatment with sodium carbonate or sodium hydroxide. Sodium salts of these preparations show a comparatively slight yellow color and freely dissolve in cold water. These materials possess also similar therapeutic properties to those noted for phenylazodiaminopyridine.

By "arylated azotized diamino pyridine" is meant any phenyl group which can contain any radical such as, carboxylic, nitro group, iodine, hydroxy group, amino group, nitrile C≡N, and the like.

As many apparently widely different embodiments of this invention may be made without departing from the spirit thereof, it will be understood that I do not intend to limit myself to the specific embodiment herein set forth except as indicated in the appended claims.

What is claimed as new is:—

1. A medicinal substance including arylated azotized diamino-pyridines, prepared for use in the treatment of germ infections.

2. A medicinal preparation including a substance non-toxic in approved dosage having the general formula

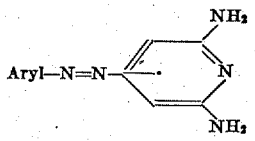

prepared for use in the treatment of germ infections.

3. As a medicinal substance, phenylazodiaminopyridine hydrochlorides crystallized in the form of dark red needles, soluble in water to form a 1.5% solution at 16° C., prepared for use in the treatment of germ infections.

4. A process for producing a medicinal substance for use in the treatment of germ infections, which comprises linking diaminopyridine with a diazotized aryl amine to obtain an aryl azo diaminopyridine and purifying to remove the harmful by-products.

5. A process for producing a medicinal substance for use in the treatment of germ infections, which comprises diazotizing an aromatic amine, coupling the diazotized amine with 2–6 diaminopyridine to obtain an aryl-azo-diaminopyridine and purifying to remove the harmful by-products.

6. A process for producing a medicinal substance for use in the treatment of germ infections, which comprises diazotizing aniline, coupling the diazotized aniline with 2–6 diaminopyridine, forming a soluble acid salt, purifying by decomposing the acid salt by treatment with an alkali material, removing by-products, treating the purified basic material thus produced to form again an acid salt of phenyl-azo-diaminopyridine.

7. The process of rendering innocuous, various forms of microbes, particularly those of the cocci group, which consists in subjecting them to an arylated azotized diamino-pyridine in divided condition.

8. The process of rendering innocuous, various forms of microbes, particularly those of the cocci group, which consists in subjecting them to arylated azotized diamino-pyridine hydrochlorides prepared for the purpose in divided condition.

9. The process of rendering innocuous, various forms of microbes, particularly those of the cocci group, which consists in subjecting them to a suspension of divided arylated azotized diaminopyridine prepared for the purpose.

10. A medicinal substance prepared for use in the treatment of germ infections, including an arylated azotized diamino-pyridine finely divided and in segregated masses of suitable dosage.

Signed at New York, in the county and State of New York, this 15th day of February, A. D., 1929.

IWAN OSTROMISLENSKY.